Jan. 4, 1949. W. J. CHAMBERS 2,457,867
APPARATUS FOR VACUUM SEALING CANNED FOOD
Filed Sept. 22, 1945 2 Sheets-Sheet 1

INVENTOR.
William J. Chambers.
BY
Robert H. Wendt
Atty.

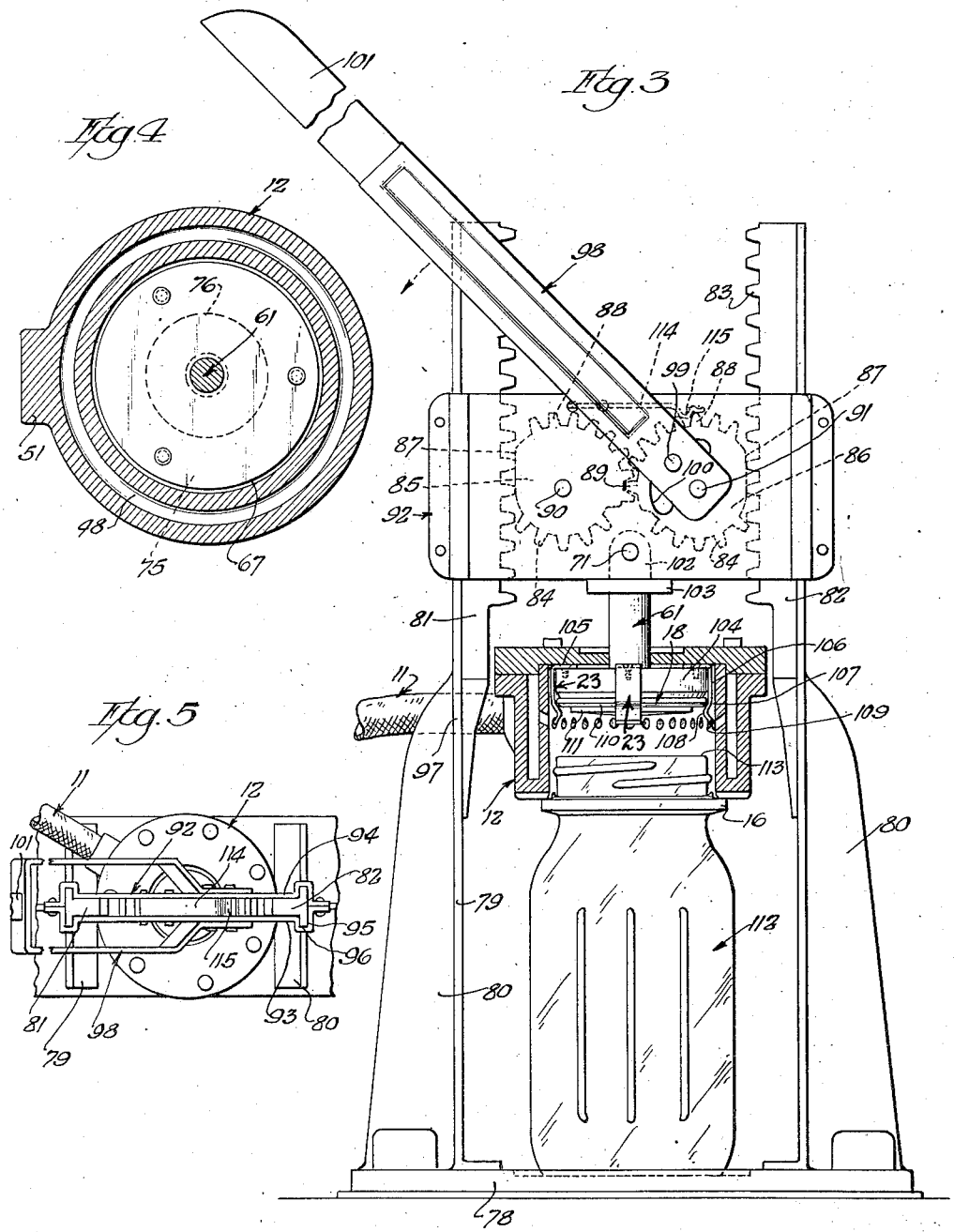

Patented Jan. 4, 1949

2,457,867

UNITED STATES PATENT OFFICE 2,457,867

APPARATUS FOR VACUUM SEALING CANNED FOOD

William J. Chambers, Chicago, Ill.

Application September 22, 1945, Serial No. 617,979

7 Claims. (Cl. 226—82)

1

The present invention relates to methods and apparatus for vacuum sealing canned food and is particularly concerned with portable devices adapted to be used in the home. When canned food such as fruits and vegetables are subjected to the methods of the prior art in vacuum sealing considerable spoilage results, which sometimes amounts to as much as 25% of the food canned with the methods of the prior art.

One of the objects of the present invention is the provision of improved methods and apparatus of the portable type which can be used in the home, by means of which the operator may be assured of getting the upper end of the jar sterile and the cap applied in such manner as to produce a vacuum without getting any germs in the top of the jar that may cause spoilage or ptomaine poisoning.

Another object of the invention is the provision of improved methods and apparatus by means of which caps may be applied to jars containing fruits or vegetables at home with a much better vacuum and substantially without any spoilage as compared with the methods and apparatus of the prior art.

Another object of the invention is the provision of improved methods and apparatus for vacuum canned sealing which are equally adaptable to the application of metal covers or glass covers, and which may be used with all kinds of fruit jars Another object of the invention is the provision of an improved portable apparatus for vacuum canned sealing which may be operated to produce absolutely sterile conditions and which may be operated very expeditiously so that food may be vacuum sealed at home fully as effectively as it can be done with the complicated factory machines and methods of the prior art.

Another object of the invention is the provision of improved vacuum sealing apparatus which may be manufactured very cheaply so that it may be placed on the market at a low price, and so that it can be purchased by the general public with a minimum amount of expenditure.

Another object of the invention is the provision of improved vacuum sealing apparatus which is sturdy, capable of being used for a long time without necessity for repair or replacement and it is simple in its operation so that complicated instructions are not necessary and so that it may be operated by anyone with a minimum amount of experience in such matters.

Another object of the invention is the provision of improved vacuum sealing apparatus of the class described, which is mechanically safe against danger of accident to the operator and which may be used upon fruit containers of various different sizes.

Other objects and advantages of the invention will be apparent from the following description and the accompanying drawings in which similar characters of references indicate similar parts throughout the several views:

Referring to the two sheets of drawings:

Fig. 3 is a view similar to Fig. 1 of a modification with the vacuum sealing device shown in partial section on a vertical axial plane;

Fig. 4 is a horizontal sectional view taken on the plane of the line 4—4 of Fig. 2 looking in the direction of the arrows, and Fig. 5 is a top plan view of the modified apparatus of Fig. 3.

Figure 1:
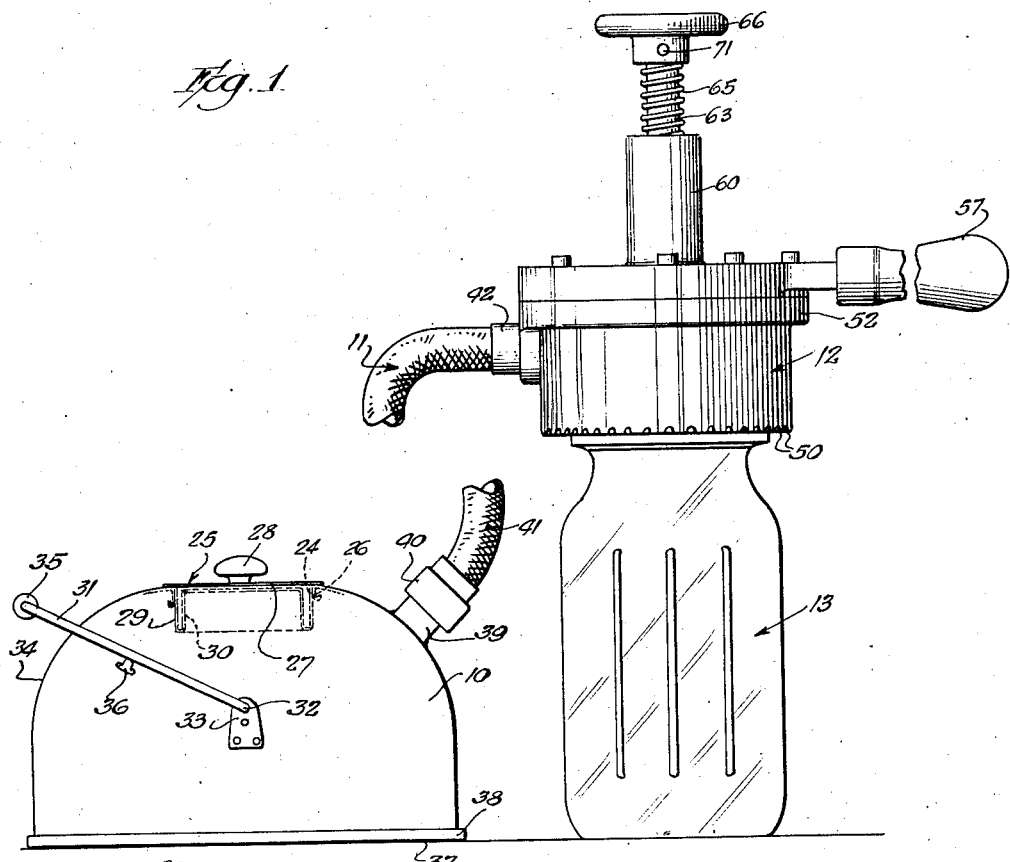
Fig. 1 is a diagrammatic elevational view showing the apparatus assembly in connection with a food container of the fruit jar type.

Referring to Fig. 1, the apparatus assembly there illustrated preferably includes a source of steam under pressure such as the kettle 10, a connecting conduit and the vacuum sealing device 12 which is shown in connection with a fruit jar 13.

Figure 2:
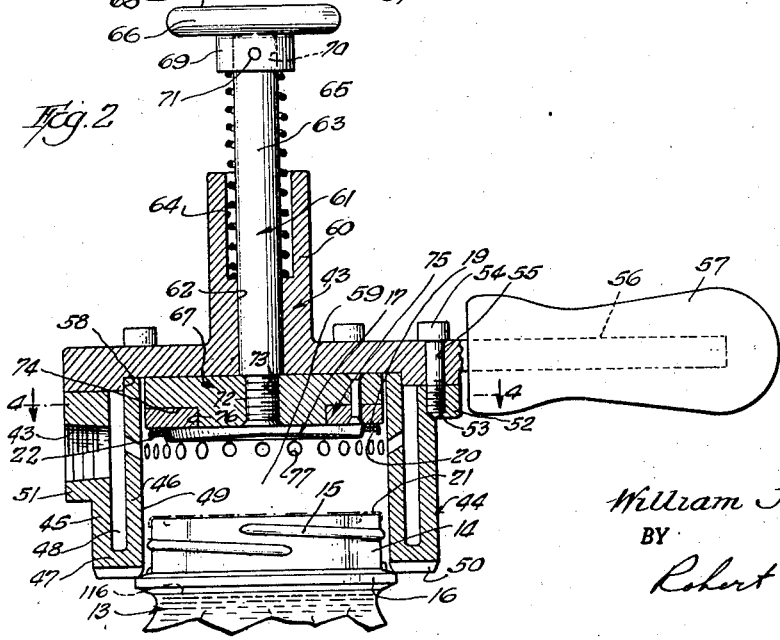
Fig. 2 is a vertical sectional view taken on the axis of the centrally located plunger of Fig. 1 looking in the direction of the arrows with the plunger, handle and jar in elevation.

The fruit jar may be of the usual type comprising a glass container having a cylindrical upper portion 14 provided with helical screw threads 15, and it is provided with a radially extending flange 16 upon which the vacuum sealing device may rest, as shown in Fig. 2.

The jar 13 may be closed by means of a metal cap 17, as shown in Fig. 2, or by means of a glass cap 18, as shown in Fig. 3. The metal cap 17 comprises a sheet metal member made of iron or steel, which is preferably covered with a coating of tin and it is circular in shape, and provided adjacent its edge with a pressed rib formation 19 which forms a downward groove 20 that engages the top edge 21 of the jar 13. The groove 20 of the cap 17 is provided with a sealing compound 22 which adheres to the cap and is already in position to effect an air-tight seal with the jar 13 when the cap is applied. Seal 22 may also be loose on cap.

Such caps may be purchased upon the open market and may be of various shapes, but the apparatus in Fig. 2 is particularly adapted to apply caps made of magnetic metal. This apparatus, however, may be provided with the fingers 23 of Fig. 3 that are adapted to engage a glass cover or some other nonmagnetic cover. The apparatus of Fig. 3 might also be provided with a magnet, as shown in Fig. 2. The kettle 10 may consist of any suitable sheet metal container or cast metal container for generating steam. It is provided with a filling opening 24 at the center top that is closed by a cover 25. The filling opening 24 may be bordered by a downwardly turned flange 26, and this flange has an air-tight frictional engagement with the cover 25.

The cover 25 may comprise a sheet metal member having a circular body 27 provided with a knob 28, and the circular body 27 is bordered by annular depending and upwardly extending flanges 29, 30 which are substantially U-shaped in cross section. This gives the cover sufficient resiliency to cause it to effect an air-tight engagement with the opening 24, but in the event of the generation of too much pressure the cover 25 will be forced off by the steam pressure before sufficient pressure is generated to prevent any possibility of an explosion.

The kettle may be provided with the usual pivoted wire bail 31 of substantially U-shape, having outwardly turned ends 32 which engage in the apertures provided in metal ears 33 which are riveted to the side wall 34 of the kettle. Bail 31 has a wooden tubular handle 35 and may engage a stop 36 to hold the bail upward out of range of the flames of the stove on which the kettle sits.

When the kettle 10 is made of sheet metal its bottom 37 is joined to the side wall 34 by a double upwardly turned crimp 38. Kettle 10 is provided with a discharge spout 39 adapted to receive a suitable fitting 40 carried by the rubber pressure hose 41, which has a fitting 42 at the other end adapted to be screwed into the inlet bore 43 of the vacuum sealing device 12. Conduit 11 includes the hose and the two necessary fittings. The vacuum sealing device 12 is preferably constructed of one or more metal castings which are preferably made of light metal such as aluminum or magnesium so as to be easy to handle by the housewife. In some embodiments the spout 39 may extend from cover 25.

In the device illustrated is included an upper casting 43 and a lower casting 44. The lower casting 44 comprises an annular metal member formed with outer wall 45, inner wall 46, bottom wall 47 and an annular steam chamber 48. The two walls 45, 46 are preferably substantially cylindrical and the inner diameter of the inner wall 46 is such that the bore 49 clears the glass screw threads 15 yet does not clear the radial flange 16. In one modification the device may be all one integral casting, and the annular cavity may be eliminated, steam passing directly from the inlet 43 through one hole 77 into the chamber 59. The purpose of the annular chamber 48 is to distribute the steam about the head so that it may come in from all sides in one embodiment of the invention and also to provide a water trap to catch the water that condenses from the steam. This may be emptied by turning the device upside down from time to time.

The lower wall 47 is preferably provided with grooves and teeth 50 so that when the device rests on the flange 16 of jar 13, steam or vapor may escape through the grooves between the teeth 50. The clearances between the bore 49 and the upper part 14 of the jar also provide a conduit for escape of the steam. At one side the lower casting 44 is formed with a radial enlargement 51 provided with the threaded inlet bore 43 for steam. At its upper end the outer wall 45 is provided with the radially extending attaching flange 52, having threaded bores 53 for receiving the screw bolts 54, by means of which the upper casting or cover is secured to the lower casting or body.

The screw bolts 54 pass through aperture 55 in the cover 43, and are preferably equally spaced from each other. The cover 43 comprises a substantially circular metal member provided with a radially extending tank 56, which may have a wooden or other heat insulating handle 57 secured upon it. The circular cover 43 is preferably provided with a shallow cylindrical recess 58 of sufficient size to receive the inner wall 46 of the body 44, and the inner wall 46 may accordingly be made slightly longer than the outer wall 45.

Suitable gaskets may be employed between cover 43 and flange 52, but no gasket is employed between wall 46 and cover 43, as any slight leakage of steam into the interior 59 is immaterial. Cover 43 has an upwardly projecting, centrally located cylindrical boss 60 adapted to serve as a support and guide for a plunger 61. Boss 60 has a through bore 62 for slidably receiving the cylindrical plunger rod 63, and also has an enlarged counterbore 64 for receiving a helical compression spring 65.

Plunger 61 comprises the rod 63, knob 66, and cap lifting head 67. The knob 66 may be of metal or it may be of heat insulating material, such as a phenolic compensation compound. It has a flat upper surface 68 and a hub 69, with a bore 70 for receiving the rod 63, which is secured into place by a pin 71 passing through the rod and hub and riveted in place. At its lower end the rod 63 has a reduced threaded portion 72, which is threaded into a complementary bore 73 in the cap-engaging head 67. Head 67 consists of a disc of nonmagnetic metal, such as one of the light metals, for example, aluminum, of such size that it may be received in the cylindrical chamber 59. Disc 67 is rabbeted adjacent its periphery on its lower side at 74 to receive a permanent magnet 75 of annular form and rectangular cross section.

Magnet 75 may be of high coercive force, being made of "Alnico," in which case its size may be correspondingly reduced; but its polarity is such that a pole is located below and another above the annular magnet. In any event, the strength of the magnet with relation to a metal cap 17 is such that the magnet will lift the weight of the cap, but is not strong enough to pull the cap off the container after the cap has been pushed down into place with steam passing through the device.

It is found that during this operation, when the cap is pushed down on the can, sufficient vacuum forms at once to hold the cap and push it off the magnet. Magnet 75 may be secured in place by rivets, as shown, or may have a frictional fit on a reduced cylindrical portion 76 of the head 67. The compression spring 65 is fitted in the counterbore 64 surrounding the plunger rod 63, and engaging the end of the hub 69. It is of sufficient strength to hold the plunger 61 in the upper position, shown in Fig. 2. The range of movement of the plunger must be sufficient so that when it is pushed down, the cap 17 will engage the top of the jar 13.

The inner wall 46 of the lower casting or body 44 has a multiplicity of diagonally inwardly and downwardly directed steam apertures 77 located to communicate with the annular space 48 and with the space 49 above the jar, and below the cover 17 when it is in the position of Fig. 2. Apertures 77 tend to direct the steam downward into the mouth of the jar 13 displacing the air until air and steam are discharged through the grooves between the ribs at the flange 16.

With the device of Figs. 1 and 2 the sealing device is held in one hand by means of the handle 57 and it is applied to jars which are brought near to the assembly, the kettle 10 being on a suitable heater such as a gas burner.

Referring now to Figs. 3 and 5, these views show a modified form of device in which the vacuum sealing device is self-supported, but is provided with a lever for its manipulation in this case. The device may be provided with a metal base 78 having a pair of upwardly extending columns 79 and 80, which may be of substantially T-shape, being provided with a reenforcing flange 80. At the upper end the columns 79 and 80 are also of T-shape having an inwardly extending rack flange 81, 82 on each column.

The teeth 83 of the rack are adapted to mesh with teeth 84 on the two segmental gears 85, 86, but the teeth 84 extend over only a portion of the periphery of the gears 85, 86, these gears also having flat portions 87 that slide past the rack teeth 83. Gears 85, 86 also have teeth 88 oppositely located to the teeth 84 and are adapted to mesh with each other at 89. The gears 85, 86 may be supported by means of pivot pins 90, 91 on a slider head 92. This slider head comprises a pair of sheet metal plates 93, 94 which are formed with pressed ribs 95 and grooves 96 on their inner sides for receiving the flange 97 of each column 80. The plates 93, 94 are placed sufficiently to slidingly receive the racks 81, 82 and to receive the gears 85, 86, these plates being secured by the pivot pins 90, 91 which serve as rivets also. Pivot pin 91 is long enough to provide pivotal support for a handle lever 98, which may be made of sheet metal and which is provided with a rivet 99 extending through an arcuate slot 100, the rivet being fixedly secured to one gear 86. Handle lever 98 may have a nonmetallic handle member 101 at its end. The slider head 92 may support an assembly similar to that of Fig. 2, the pin 71 serving in this case to secure the plunger 61 to the slider head 92. In this case plunger rod 63 may have a flattened end portion 102 which is received between the plates 93, 94 to which it is riveted by pin 71 in such manner as to permit a limited pivotal movement.

Radial flange 103 limits pivotal movement of the plunger 61 on the sliding head 92 by engaging the bottom of head 92. It has already been pointed out that the device of Fig. 3 may be utilized with the magnet plunger of Fig. 2. The plunger illustrated, however, is adapted to lift glass caps 18. For this purpose the circular disk 104, which is secured to the plunger rod 61 in a manner similar to Fig. 2, is provided with spring fingers 23. These fingers are thin enough to be received between the disk 104 and the inner wall 46. Each finger has a radially extending attaching flange 105 that is riveted or pinned to the top of the disk 104.

From the flange 105 each finger 23 has a downwardly extending body 106 which curves inward at 107, has a camming portion 108 and has its extreme end extending out at 109. The camming portion 108 is adapted to slide past a glass cap 18 while the fingers are pressed apart by the cap, then the cap is retained above the ridge 108 on the fingers. The fingers are preferably equally spaced and a plurality are used. The disk 104 in this case does not have the magnet 75, but its lower side is of such shape as to receive the upper face of a glass cap 18. The glass cap has a rubber sealing ring 110 applied to the cap surrounding the reduced cylindrical portion 111 of the cap. Reduced cylindrical portion 111 of the cap is received in the mouth of the jar 112 while the rubber sealing ring 110 engages the upper edge 113 and effects an air-tight closure. The strength of the springs 23 is such that they will lift the cap 18 when there is no vacuum in the jar, but when steam has been applied and the cover is pushed down by means of handle 101 a vacuum is quickly formed of sufficient strength to hold the cover and withdraw it from the fingers 23 when the handle 101 is pushed up again. A leaf spring 114 is carried by the sliding head 92, and has a retaining end portion 115 that is curved to be cammed upward by the gear teeth, but has a pressed groove that receives the adjacent gear tooth and holds the gears and handle into any position to which the operator may move them.

The operation of the mechanism of Fig. 3 is as follows:

When the head 92 has its handle and gears in the position shown it may be slid upward or downward on the columns 80 to adjust the height of the head to cans of any length. During this motion the flat edge portions 87 of the gears slide past the teeth 83 on the racks. If the handle 101 is then pivoted downward slightly in a counterclockwise direction, teeth 84 will engage the rack teeth 83, gear 86 will, of course, mesh with gear 85 by means of teeth 88 causing both gears to move simultaneously.

As soon as any gear tooth engages the rack the sliding head 92 will be held in that adjusted position. This adjusted position should be such that the teeth 50 on the lower wall 47 of the body 44 of the vacuum sealing device 12 will rest on the jar flange 16, then if the handle 101 is pushed downward farther it will cause the disk 103 and fingers 23 to engage cap 18, which may be lifted from the mouth of the jar by moving the lever upward again.

The operation of the vacuum sealing apparatus is substantially as follows:

The jar is filled with fruits or vegetables or other food and heated and sterilized, the filling being to a point illustrated by the dotted line 116 of Fig. 2. The kettle 10 has been previously brought to a boil with its cover closed and its hose attached to the vacuum sealing device of Figs. 1, 2 or 3. A cap is then placed on top the mouth of the jar, such as a metal cap in Fig. 2 or a glass cap in Fig. 3.

The jar 13 or 112 is brought into the position shown in Figs. 2 or 3 with the body 44 of the device resting on the flange 16. Steam then passes from the kettle 10 through the conduit 11 into the annular chamber 48 and the cover being carried downward on the jar it passes over the cover and out of the grooves between the teeth 50 driving the air out. The operator should then push downward on the handle 66 and the magnet 75 will engage the metal cover 17 and lift it to the position of Fig. 2 above the apertures 77. The same result may be secured in Fig. 3 by causing the disk 104 and fingers 23 to lift the glass cover 18.

The steam will pass over the cover and will be directed downwardly into the mouth of jar 13 or 112 driving out the air, the air and steam escaping through the grooves between the teeth 50.

All of the space in the chamber 49 and top of jar 13 above food level 116 having been filled with steam the operator may push plunger 61 down again with handle 66. The steam inside the mouth of the jar 13 is immediately isolated from that above the cover 17 in space 49 which becomes hotter than the steam under the cover. A vacuum begins to form at once in jar 13 and the air pressure or the differential of pressure holds the cover on the jar and pushes it away from the magnet 75 or the fingers 23 when the plunger 61 rises again. The jar may then immediately be removed from the device and further cooling effects a satisfactory vacuum for preservation of the food.

Canned peas are frequently canned at a vacuum of 14 inches of mercury and canned corn at 15 inches of mercury, while the applicant has found that his device will equally produce a vacuum as high as 28 inches of mercury.

The method of vacuum sealing fruit in containers according to my invention may be briefly summarized as follows:

The containers are sterilized and filled to a predetermined level with food which has been heated and sterilized. A closure cover is placed on the open mouth of the container and thereupon steam is directed into a chamber surrounding the closure cover and top of the container over the closure, thus sterilizing the top of the cover and such portions of the container as are then exposed to steam in this chamber.

This cover is then lifted by mechanical devices located in the chamber and actuated by remotely controlled actuating devices so that the cover may be lifted and its lower side sterilized by a continuous supply of superheated steam under pressure. The open mouth of the container is sterilized while the cover is held up and the air is driven out by steam, a slight pressure being maintained in the chamber between the cover and the open mouth, but the steam being permitted to escape down the side of the container.

The cover is then again deposited on the open mouth of the container by mechanical devices remotely actuated from the outside of the chamber so that hands do not touch the cover and it is maintained in sterile condition, as are also the inside and outside of the top of the jar. The cover is placed in its sealing position and steam is passed over the top of the cover. The steam is then hotter than that below the cover which is permitted to cool starting to form a vacuum, the differential of pressure drawing the cover free from such mechanical devices and holding the cover on the container. The jar is then removed from the vacuum sealing device, or the vacuum sealing device is lifted from the jar, leaving the cover in place, after which the steam under the cover cools and condenses and forms a relatively high vacuum, considering the present purposes. Germs of all kinds are substantially excluded. The seal between the cover and the top of the jar is improved by immediately applying an annular screw member which fastens the cover in place by screwing on the screw threads 15.

Another method of handling the apparatus of Fig. 2 is as follows: The operator may place a cap 17 in the chamber 59, either by shoving it up until the magnet holds it, or by inverting the device and laying the cap inside. Then the device is placed upon the jar 13, and steam is passed under the cap and into the open mouth of the jar to sterilize the under side of the cap, the mouth of the jar, and the food inside. Then the operator presses down on the plunger 61, seating the cap on the jar, and the steam passing over the top of the cap makes space above the cap hotter, while the space below the cap cools.

This immediately begins the formation of a vacuum by the condensation inside the jar; and when the plunger is released and brought up to its uppermost position of Fig. 2, the vacuum holds the cap and pulls it off the magnet. Then the device may be removed from the jar and the screw flange applied to fix the cap permanently in place.

In the same way the device of Fig. 3 may be used by pushing a glass cap up into the fingers 106, and going through the same steps just described.

It should also be noted that the device of Fig. 3 may be employed with a single column, and in this case also the annular steam trap may be eliminated and steam passed directly from the hose 11 into the device through a single hole leading to the chamber 59.

It will thus be observed that I have invented an improved apparatus and method for vacuum sealing of containers of food, which apparatus is portable, simple, and economical. The technique of operating it is also simple, involving merely the boiling of the water in the kettle continuously while placing the cap on the jar that has been previously sterilized, applying the vacuum sealing device, actuating the plunger once to lift the cover, while steam is applied, and actuating the plunger again to deposit the cover, while steam is applied; and then removing the jar and applying the screw that secures the cover.

While as much as 25% spoilage has been experienced when vacuum sealing has been done at home with methods of the prior art, I have found that substantially no spoilage need occur when my vacuum sealing is accomplished by my methods properly carried out.

A vacuum as high as 28 inches has been found in jars sealed by my methods, and food has been kept for months when sealed by my method, without any spoilage in a batch of many jars.

While I have illustrated and described preferred methods and preferred forms of apparatus embodying my invention, I do not wish to be limited to the specific forms of the invention described, but desire to avail myself of all changes within the scope of the appended claims.

Having thus described my invention, what I claim as new and desire to secure by Letters Patent of the United States, is:

1. A portable home apparatus for sealing containers of the type having a radially projecting shoulder located below the mouth of the container comprising a portable head provided with a heat insulated handle and inlet means for connection to a source of heated steam, said head comprising a metal member formed with an annular wall and a downwardly open, substantially cylindrical sterilizing chamber, the size of said chamber being such that it is adapted to receive the open end of the container for food when the lower edge of said wall rests upon said shoulder, said wall being provided with an annular steam chamber communicating with said inlet means and the wall of said annular steam chamber being provided with a multiplicity of radially and downwardly directed steam apertures adapted to project steam downwardly into the mouth of said container for food, said head being provided with a centrally located plunger extending outwardly from said head through a guide boss, and supporting means carried by said plunger in said sterilizing chamber for supporting a cover for the food container above said downwardly directed apertures when the plunger is in its uppermost position, said supporting means having a predetermined resistance to the release of the cover whereby, after the bottom of the cover and the food container have been sterilized by injection of steam between them, and the cover has been depressed into engagement with the food container by said plunger, the condensation of steam inside the food container beneath the cover causes a vacuum which pulls the cover from said supporting means when the plunger is again lifted, leaving the cover held to the food container by the vacuum in the food container.

2. A portable home apparatus for sealing containers of the type having a radially projecting shoulder located below the mouth of the container comprising a portable head provided with a heat insulated handle and inlet means for connection to a source of heated steam, said head comprising a metal member formed with an annular wall and a downwardly open, substantially cylindrical sterilizing chamber, the size of said chamber being such that it is adapted to receive the open end of the container for food when the lower edge of said wall rests upon said shoulder, said wall being provided with an annular steam chamber communicating with said inlet means and the wall of said annular steam chamber being provided with a multiplicity of radially and downwardly directed steam apertures adapted to project steam downwardly into the mouth of said container for food, said head being provided with a centrally located plunger extending outwardly from said head through a guide boss, supporting means carried by said plunger in said sterilizing chamber for supporting a cover for the food container above said downwardly directed apertures when the plunger is in its uppermost position, said supporting means having a predetermined resistance to the release of the cover whereby, after the bottom of the cover and the food container have been sterilized by injection of steam between them, and the cover has been depressed into engagement with the food container by said plunger, the condensation of steam inside the food container beneath the cover causes a vacuum which pulls the cover from said supporting means when the plunger is again lifted, leaving the cover held to the food container by the vacuum in the food container, the said plunger being provided on its upper end by an actuating member, and resilient means compressed between the plunger and its guide boss for urging the plunger to uppermost position.

3. A portable home apparatus for sealing containers of the type having a radially projecting shoulder located below the mouth of the container comprising a portable head provided with a heat insulated handle and inlet means for connection to a source of heated steam, said head comprising a metal member formed with an annular wall and a downwardly open, substantially cylindrical sterilizing chamber, the size of said chamber being such that it is adapted to receive the open end of the container for food when the lower edge of said wall rests upon said shoulder, said wall being provided with an annular steam chamber communicating with said inlet means and the wall of said annular steam chamber being provided with a multiplicity of radially and downwardly directed steam apertures adapted to project steam downwardly into the mouth of said container for food, said head being provided with a centrally located plunger extending outwardly from said head through a guide boss, and supporting means carried by said plunger in said sterilizing chamber for supporting a cover for the food container above said downwardly directed apertures when the plunger is in its uppermost position, said supporting means having a predetermined resistance to the release of the cover whereby, after the bottom of the cover and the food container have been sterilized by injection of steam between them, and the cover has been depressed into engagement with the food container by said plunger, the condensation of steam inside the food container beneath the cover causes a vacuum which pulls the cover from said supporting means when the plunger is again lifted, leaving the cover held to the food container by the vacuum in the food container, the said supporting means on said plunger comprising a non-magnetic disk carried by the plunger, said non-magnetic disk supporting a permanent magnet of annular shape adapted to attract and to support the cover for the food container.

4. A portable home apparatus for sealing containers of the type having a radially projecting shoulder located below the mouth of the container comprising a portable head provided with a heat insulated handle and inlet means for connection to a source of heated steam, said head comprising a metal member formed with an annular wall and a downwardly open, substantially cylindrical sterilizing chamber, the size of said chamber being such that it is adapted to receive the open end of the container for food when the lower edge of said wall rests upon said shoulder, said wall being provided with an annular steam chamber communicating with said inlet means and the wall of said annular steam chamber being provided with a multiplicity of radially and downwardly directed steam apertures adapted to project steam downwardly into the mouth of said container for food, said head being provided with a centrally located plunger extending outwardly from said head through a guide boss, and supporting means carried by said plunger in said sterilizing chamber for supporting a cover for the food container above said downwardly directed apertures when the plunger is in its uppermost position, said supporting means having a predetermined resistance to the release of the cover whereby, after the bottom of the cover and the food container have been sterilized by injection of steam between them, and the cover has been depressed into engagement with the food container by said plunger, the condensation of steam inside the food container beneath the cover causes a vacuum which pulls the cover from said supporting means when the plunger is again lifted leaving the cover held to the food container by the vacuum in the food container, the said supporting means on said plunger comprising a supporting disk and a plurality of symmetrically located downwardly extending spring fingers, each of said fingers having an inwardly projecting ridge adapted to cam over the edge of the cover of the food container, the resiliency of said fingers being such that they are adapted to give and release the cover against the force tending to retain the cover which is caused by the vacuum in the food container.

5. In a home vacuum sealing device, the combination of a steam head comprising an annular cast metal member formed with a cylindrical chamber open at both ends and with an upwardly open annular steam manifold in its wall, said steam manifold having a threaded inlet for connection to a source of heated steam, and the inner wall of said steam manifold having a multiplicity of radially and downwardly directed steam ports for directing steam into the mouth of a food container, said casting having a cylindrical sterilizing chamber of a size adapted to receive the mouth of a food container when the lower edge of the wall of said casting rests upon an annular shoulder carried by the food container, a closure plate for said first mentioned casting comprising a second cast metal member of circular shape adapted to fit on the top of the first mentioned casting and to close the sterilizing chamber and the steam manifold, said second casting being formed with a centrally located guide boss and a cylindrical guide bore in said boss, a cylindrical plunger mounted in said bore, a manual actuator carried by the upper end of said plunger, spring means compressed between said boss and said actuator and urging said plunger to its uppermost position, a disk carried by the lower end of said plunger, and supporting means carried by said disk of sufficient strength to lift and support a metallic cover for said food container whereby the plunger may be depressed to lift the cover from the food container so that the steam may issue from said ports into said sterilizing chamber between the cover and the mouth of the food container, being directed downwardly into said food container to drive out the air through the crank between the lower edge of the first mentioned casting and the shoulder on the food container, the said supporting means being sufficiently weak whereby it is adapted to release the cover when the plunger is depressed into engagement with the open mouth of the food container cutting off the supply of heat from the steam issuing from said ports which causes the steam below the cover and in the food container to condense and form a vacuum which holds the cover on the food container when the plunger is again permitted to rise.

6. In a home vacuum sealing device, the combination of a steam head comprising an annular cast metal member formed with a cylindrical chamber open at both ends and with an upwardly open annular steam manifold in its wall, said steam manifold having a threaded inlet for connection to a source of heated steam, and the inner wall of said steam manifold having a multiplicity of radially and downwardly directed steam ports for directing steam into the mouth of a food container, said casting having a cylindrical sterilizing chamber of a size adapted to receive the mouth of a food container when the lower edge of the wall of said casting rests upon an annular shoulder carried by the food container, a closure plate for said first mentioned casting comprising a second cast metal member of circular shape adapted to fit on the top of the first mentioned casting and to close the sterilizing chamber and the steam manifold, said second casting being formed with a centrally located guide boss and a cylindrical guide bore in said boss, a cylindrical plunger mounted in said bore, a manual actuator carried by the upper end of said plunger, spring means compressed between said boss and said actuator and urging said plunger to its uppermost position, a disk carried by the lower end of said plunger, supporting means carried by said disk of sufficient strength to lift and support a metallic cover for said food container whereby the plunger may be depressed to lift the cover from the food container so that the steam may issue from said ports into said sterilizing chamber between the cover and the mouth of the food container, being directed downwardly into said food container to drive out the air through the crack between the lower edge of the first mentioned casting and the shoulder on the food container, the said supporting means being sufficiently weak whereby it is adapted to release the cover when the plunger is depressed into engagement with the open mouth of the food container cutting off the supply of heat from the steam issuing from said ports which causes the steam below the cover and in the food container to condense and form a vacuum which holds the cover on the food container when the plunger is again permitted to rise, one of said castings being formed with a radially extending integral tang, and a heat insulating handle carried by said tang.

7. In a home vacuum sealing device, the combination of a steam head comprising an annular cast metal member formed with a cylindrical chamber open at both ends and with an upwardly open annular steam manifold in its wall, said steam manifold having a threaded inlet for connection to a source of heated steam, and the inner wall of said steam manifold having a multiplicity of radially and downwardly directed steam ports for directing steam into the mouth of a food container, said casting having a cylindrical sterilizing chamber of a size adapted to receive the mouth of a food container when the lower edge of the wall of said casting rests upon an annular shoulder carried by the food container, a closure plate for said first mentioned casting comprising a second cast metal member of circular shape adapted to fit on the top of the first mentioned casting and to close the sterilizing chamber and the steam manifold, said second casting being formed with a centrally located guide boss and a cylindrical guide bore in said boss, a cylindrical plunger mounted in said bore, a manual actuator carried by the upper end of said plunger, spring means compressed between said boss and said actuator and urging said plunger to its uppermost position, a disk carried by the lower end of said plunger, supporting means carried by said disk of sufficient strength to lift and support a metallic cover for said food container whereby the plunger may be depressed to lift the cover from the food container so that the steam may issue from said ports into said sterilizing chamber between the cover and the mouth of the food container, being directed downwardly into said food container to drive out the air through the crack between the lower edge of the first mentioned casting and the shoulder on the food container, the said supporting means being sufficiently weak whereby it is adapted to release the cover when the plunger is depressed into engagement with the open mouth of the food container cutting off the supply of heat from the steam issuing from said ports which causes the steam below the cover and in the food container to condense and form a vacuum which holds the cover on the food container when the plunger is again permitted to rise, one of said castings being formed with a radially extending integral tang, and a heat insulating handle carried by said tang, and said first mentioned casting having its lower edge formed with a plurality of serrations providing escape ports between said lower edge and the shoulder on said food container for the escape of air and steam from said sterilizing chamber.

WILLIAM J. CHAMBERS.

REFERENCES CITED

The following references are of record in the file of this patent:

UNITED STATES PATENTS

| Number | Name | Date |
|---|---|---|
| 123,418 | Phelps | Feb. 6, 1872 |
| 1,744,076 | Lebherz | Jan. 21, 1930 |
| 2,152,534 | Carvalho et al. | Mar. 23, 1939 |
| 2,339,035 | Stewart et al. | Jan. 11, 1944 |

FOREIGN PATENTS

| Number | Country | Date |
|---|---|---|
| 484,120 | Great Britain | May 2, 1938 |